US012703415B2

(12) United States Patent
Bornemann et al.

(10) Patent No.: US 12,703,415 B2
(45) Date of Patent: Aug. 11, 2026

(54) METHOD AND APPARATUS FOR RECONFIGURABLE HANDLES FOR A WORK EQUIPMENT

(71) Applicant: Illinois Tool Works Inc., Glenview, IL (US)

(72) Inventors: Brian J. Bornemann, Appleton, WI (US); Andrew Pfaller, Hilbert, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 18/665,879

(22) Filed: May 16, 2024

(65) Prior Publication Data

US 2024/0300565 A1 Sep. 12, 2024

Related U.S. Application Data

(63) Continuation of application No. 16/857,871, filed on Apr. 24, 2020, now Pat. No. 12,005,948.

(60) Provisional application No. 62/847,050, filed on May 13, 2019.

(51) Int. Cl.

| | |
|---|---|
| ***B62B 5/06*** | (2006.01) |
| ***B23K 37/02*** | (2006.01) |
| ***B62B 3/10*** | (2006.01) |

(52) U.S. Cl.

CPC .......... *B62B 5/065* (2013.01); *B23K 37/0294* (2013.01); *B62B 3/10* (2013.01); *B62B 2202/48* (2013.01)

(58) Field of Classification Search

CPC ....................... B23K 37/0294; B23K 37/0282; B23K 37/00; B23K 37/02; B23K 37/0252; B23K 37/0205; B23K 9/32; B23K 9/1006; B62B 5/065; B62B 5/064; B62B 5/00; B62B 5/06; B62B 5/066; B62B 5/068; B62B 5/067; B62B 3/10; B62B 3/00; B62B 3/08; B62B 2202/48

See application file for complete search history.

(56) References Cited

U.S. PATENT DOCUMENTS

| | | | | |
|---|---|---|---|---|
| 2,253,403 A * | 8/1941 | Steinert | B23K 9/32 | 219/136 |
| 6,489,591 B1 * | 12/2002 | Achtner | B23K 9/32 | 219/130.1 |
| 6,888,099 B1 * | 5/2005 | Schneider | H05K 7/20918 | 219/136 |
| 6,909,068 B1 * | 6/2005 | Alleman, Jr. | B23K 9/32 | 219/136 |
| 6,992,266 B1 * | 1/2006 | Di Novo | B23K 9/32 | 219/136 |
| 7,114,732 B1 * | 10/2006 | Ismail | B23K 9/32 | 280/47.34 |

(Continued)

*Primary Examiner* — James M Dolak

(74) *Attorney, Agent, or Firm* — McAndrews, Held & Malloy, Ltd.

(57) ABSTRACT

Provided is a configurable handle for a work equipment. The work equipment, which may be a welding power source, can comprise a body, and a power conversion circuitry within the body. The power conversion circuitry is configured to convert input power to welding-type power. The work equipment comprises one or more handles attached to the body for physical manipulation of the work equipment, where at least one of the handles is configured to be oriented to any of a plurality of different positions.

17 Claims, 4 Drawing Sheets

(56) References Cited

U.S. PATENT DOCUMENTS 7,126,084 B2 * 10/2006 DeYoung ................. B23K 9/32 219/136
7,285,746 B2 * 10/2007 Matiash ................... B23K 9/32 242/615.3
7,357,398 B2 * 4/2008 O'Connor ................ B25H 3/00 280/47.131
7,597,340 B2 * 10/2009 Hirose .................. B62B 5/0006 16/110.1
7,800,901 B2 * 9/2010 Borowy ................... B23K 9/32 174/16.3
8,188,405 B2 * 5/2012 Martin ................. B23K 37/003 219/136
8,302,976 B2 * 11/2012 Okabe ..................... B62B 5/067 280/37
8,653,416 B2 * 2/2014 Laitala ................. B23K 9/1006 219/133
9,149,892 B2 * 10/2015 Liebert ................... F02B 63/04
9,162,314 B2 * 10/2015 Bornemann ........... B23K 10/00
9,333,596 B2 * 5/2016 Luis y Prado ..... B23K 37/0294
9,399,263 B2 * 7/2016 Bashore ................... B23K 9/32
9,821,413 B2 * 11/2017 Feldhausen .............. B23K 9/16
10,046,411 B2 * 8/2018 Dessart .................. B23K 37/02
10,478,912 B2 * 11/2019 Evans ...................... B23K 9/32
11,052,810 B2 * 7/2021 Marcusen ............... B60P 3/055
11,897,064 B2 * 2/2024 Rozmarynowski .... B23K 9/327
11,925,008 B2 * 3/2024 Ihde ................... H05K 7/20172
12,005,948 B2 * 6/2024 Bornemann ............ B62B 5/064
12,023,764 B2 * 7/2024 Klein ................. B23K 37/0211
12,115,605 B2 * 10/2024 Becker ................. B23K 9/1062
12,162,101 B2 * 12/2024 Klein ..................... B23K 9/323
12,275,098 B2 * 4/2025 Dessart .............. B23K 37/0294
12,291,254 B2 * 5/2025 Elden ...................... B62B 3/025
12,334,577 B2 * 6/2025 Krutikova ........... H01M 50/244
12,376,920 B2 * 8/2025 Ross ...................... A61B 50/13
2008/0156783 A1 * 7/2008 Vanden Heuvel ..... B23K 9/125 219/137.2
2011/0204013 A1 * 8/2011 Lahti .................. B23K 37/0294 211/85.8
2012/0068041 A1 * 3/2012 Flattinger .......... B23K 37/0294 248/672
2020/0023872 A1 * 1/2020 McCrillis ................. B23K 7/10

* cited by examiner

METHOD AND APPARATUS FOR RECONFIGURABLE HANDLES FOR A WORK EQUIPMENT

PRIORITY/CROSS REFERENCE TO RELATED APPLICATIONS

The present application claims the benefit of U.S. Provisional Patent Application Ser. No. 62/847,050, filed May 13, 2019, entitled "Method and Apparatus for Reconfigurable Handles for a Work Equipment," the entire contents of which are expressly incorporated herein by reference.

BACKGROUND

The present disclosure relates to providing reconfigurable handles for work equipment. Limitations and disadvantages of conventional handles for a work equipment such as, for example, a welding power supply, a runner cart, etc., will become apparent to one of skill in the art, through comparison of such approaches with some aspects of the present method and system set forth in the remainder of this disclosure with reference to the drawings.

SUMMARY

Methods and systems are provided for a method and apparatus for reconfigurable handles for work equipment, substantially as illustrated by and described in connection with at least one of the figures, as set forth more completely in the claims.

BRIEF DESCRIPTION OF THE DRAWINGS

These and/or other aspects will become apparent and more readily appreciated from the following description of some example embodiments, taken in conjunction with the accompanying drawings.

The figures are not necessarily to scale. Where appropriate, similar or identical reference numbers are used for similar or identical components.

DETAILED DESCRIPTION

Aspects of the present disclosure provide for methods and systems for configuring handles of a work equipment to allow for greater flexibility in the use of the handles. For example, the handles can be configured in a first configuration to allow greater leverage for moving the work equipment, and in a second configuration for allowing, for example, cables or wires such as welding type cables to be more easily wrapped around the handles to keep them out of the way.

For the sake of ease of description, an example work equipment is described as a welding power source. However, various embodiments of the disclosure need not be so limited. A work equipment may be one of many different things, such as, for example, a welding power source, a utility cart, a runner cart, etc. While a work equipment may be mobile by being, for example, on wheels, various embodiments of the reconfigurable handles described in the disclosure may also be used with non-mobile work equipment. Additionally, the reconfigurable handles of the disclosure may be fitted into equipment that did not have them originally, but are able to accommodate the handles. Accordingly, it may be seen that various equipments may benefit from the reconfigurable handles being able to be support different orientations.

Figure 1B:
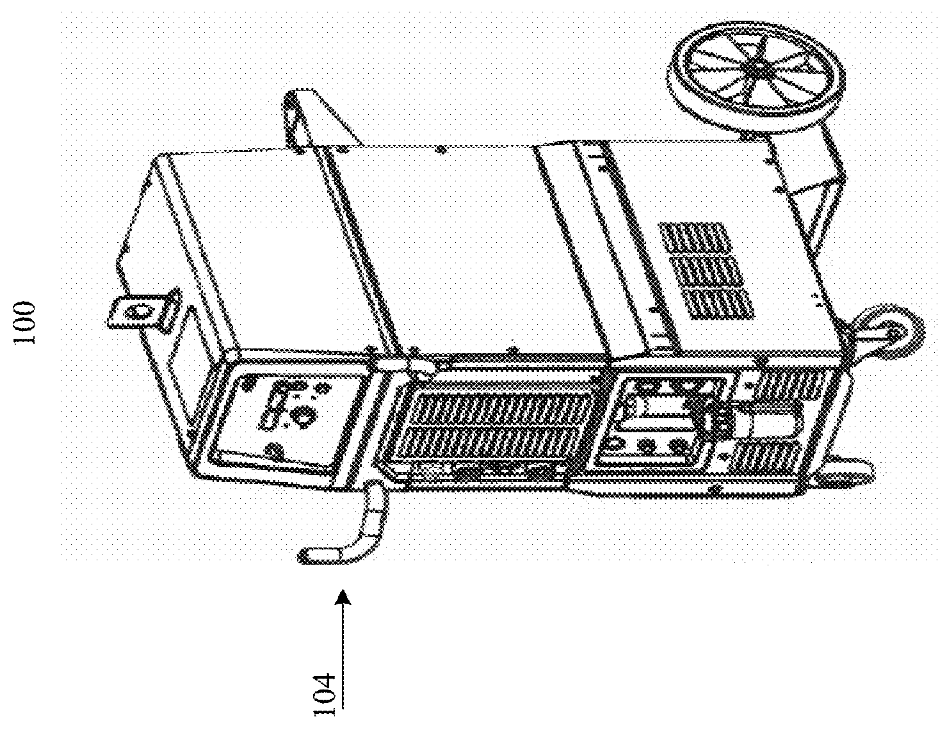
FIG. 1B is a drawing of the example work equipment with the example reconfigurable handles in a second position in accordance with an embodiment of the disclosure.
Figure 1A:
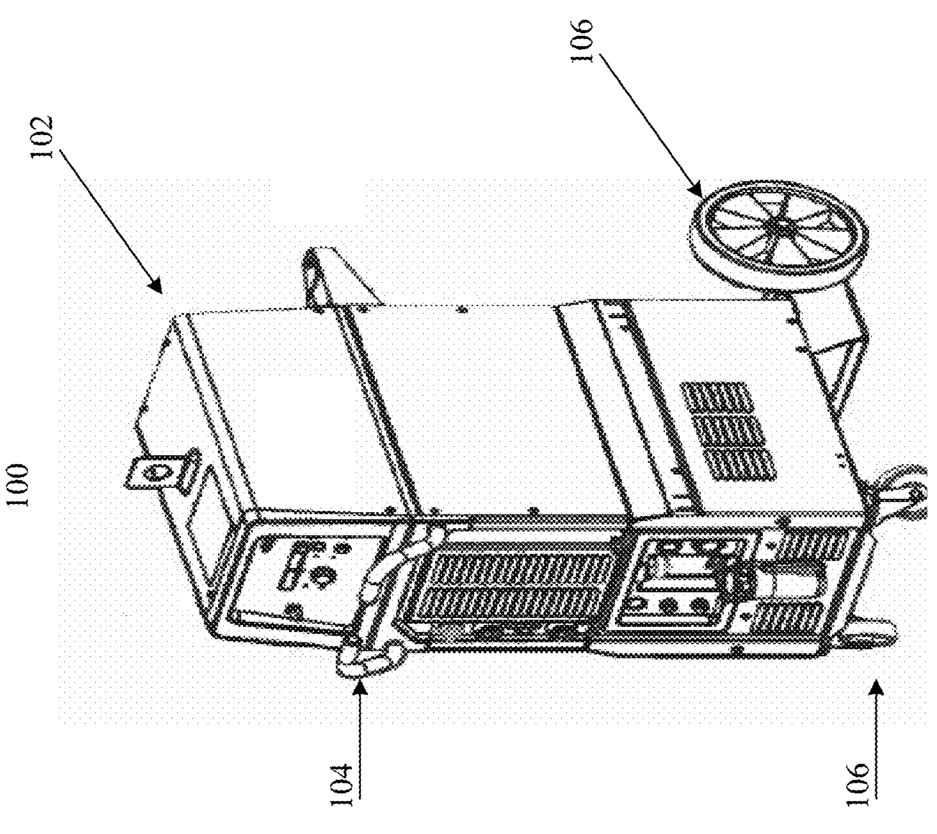
FIG. 1A is a drawing of an example work equipment with example reconfigurable handles in a first position in accordance with an embodiment of the disclosure.

FIGS. 1A and 1B show work equipment with example reconfigurable handles in different positions. FIG. 1A shows a work equipment 100 that is a welding power source. The work equipment 100 comprises the body 102, handles 104 where the handles 104 are turned in toward each other. FIG. 1B shows the work equipment 100 where the handles 104 are turned away from each other. The configuration of FIG. 1A may make it easier for a user to move the work equipment 100 from place to place. However, the configuration of FIG. 1B, where the handles are more spread out may make it easier to wrap, for example, welding type cables around the handles. This may be useful, for example, when the power equipment is being used to keep the extra lengths of, for example welding type cables from getting in the way. For example, the welding type cables lying on the floor can be a tripping hazard. Additionally, even when the work equipment is not being used at the moment, the spread out handle configuration shown in FIG. 1B may make it easier to wrap the welding type cables to keep them out of the way.

The work equipment 100 may comprise, for example, power conversion circuitry (shown in FIG. 1C) that takes input power, such as, for example, line power at 110 VAC, 220 VAC, 440 VAC, etc., to provide appropriate output power for use by the work equipment. If the work equipment is a welding power source, then there may be various output powers such as welding power at appropriate voltage for particular welding modes, power for electrical/electronic circuitry such as input interface for entering inputs, output display/lights/speaker for outputting information, etc.

The weight of the work equipment 100 may vary and may be for example, substantially 50 pounds or more. Other work equipment may be, for example, lighter than 50 pounds. In order to make the work equipment easier to move around, the work equipment 100 may have one or more wheels 106.

Figure 1C:
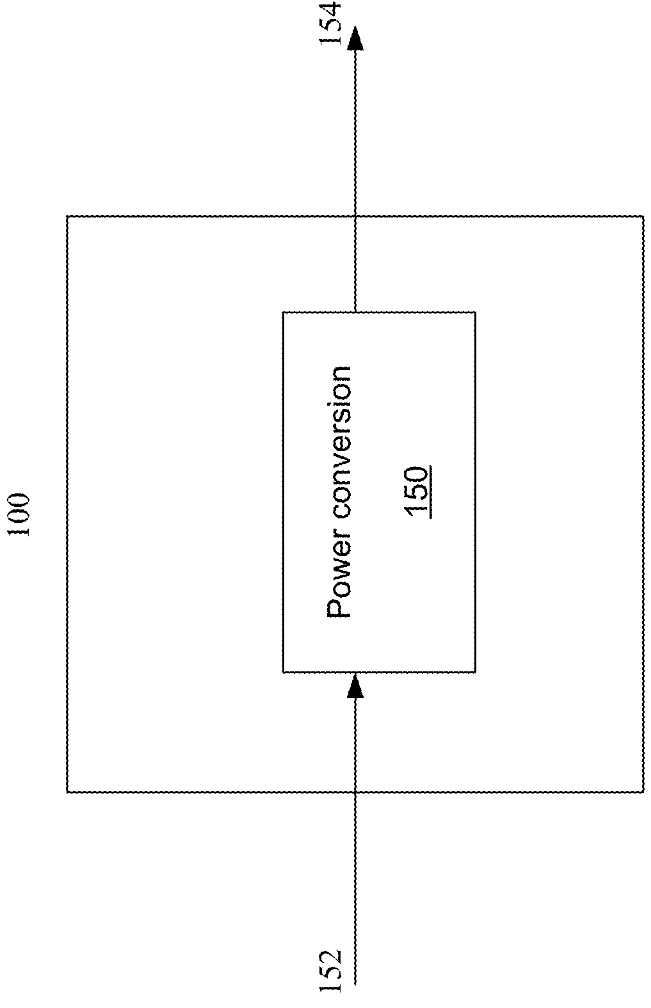
FIG. 1C is a drawing of the example work equipment with a power conversion circuitry in accordance with an embodiment of the disclosure.

FIG. 1C is a drawing of the example work equipment with a power conversion circuitry in accordance with an embodiment of the disclosure. Referring to FIG. 1C, there is shown the work equipment 100 with power conversion circuitry 150. The power conversion circuitry 150 may receive input power (line power) via the electrical conductors 152, and the output power(s) may be output via the electric conductors 154, where there may be several sets of electrical conductors 154 for different usage. For example, when the work equipment 100 is a welding power source, one set of electrical conductors 154 may provide welding power. There may be another set of electrical conductors 154 that may provide power for various circuitry and devices (e.g., input interface, output interface, etc.) for the work equipment 100. There may be still another set of electrical conductors 154 that may provide power for one or more accessory devices, such as, for example, a cooling system, light(s), etc., that are external to the work equipment 100.

Accordingly, the power conversion circuitry may receive AC power and output AC power at a different voltage(s) and/or output DC power at one or more voltages. The specific circuitry used may be design dependent.

Figure 2:
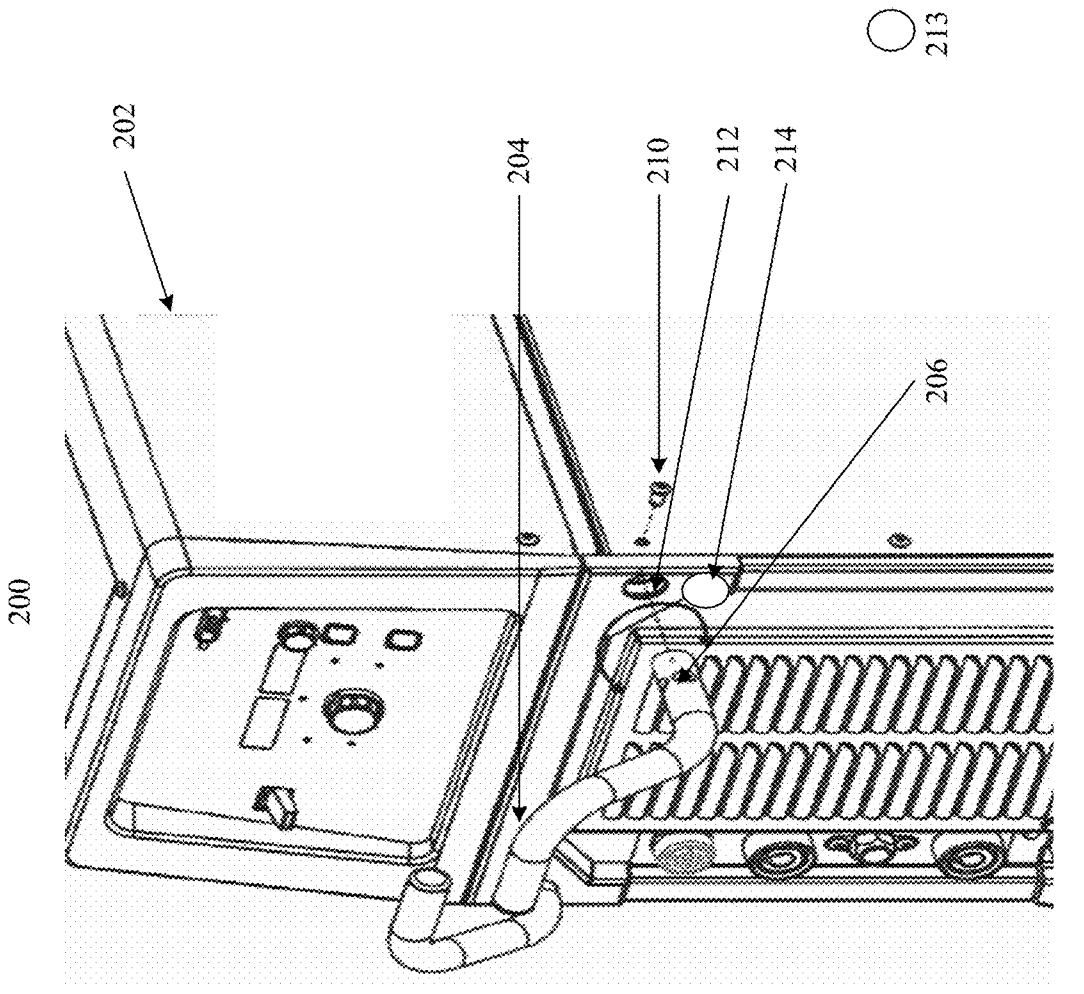
FIG. 2 is a drawing of the example work equipment with an example configuration for adjusting the reconfigurable handles in accordance with an embodiment of the disclosure.

FIG. 2 is a drawing of the example work equipment with an example configuration for adjusting the reconfigurable handles in accordance with an embodiment of the disclosure. Referring to FIG. 2, there is shown a work equipment 200 that is similar to the work equipment 100. The work equipment 200 comprises a body 202, handles 204, receiving holes 212 and 214, and a securing mechanism 210 for the receiving hole 212. While a securing mechanism is not shown for the receiving hole 214, a securing mechanism similar to the securing mechanism 210 may be used to secure a handle 204 that is inserted into the receiving hole 214. There may also be additional receiving holes in addition to the receiving holes 212 and 214. In order to cover up the receiving holes that are not used, a plug 213 can be used.

The handle 204 may be inserted into the receiving hole 212, for example, and the securing mechanism 210 may be used to secure the handle 204 in the desired orientation. The securing mechanism 210 may be, for example, a screw, a bolt, a pin, etc. The pin may be, for example, a cotter pin that goes directly into a hole 206 near an end of the handle 204, or a cotter pin that goes into a bolt that goes through the hole 206 near an end of the handle 204. The pin may also be a spring loaded pin that can be, for example, pulled out of the handle 204 to allow the handle 204 to rotate, or to allow the handle 204 to be removed from the receiving hole 212/214. By allowing the handle 204 to rotate so that the pin (securing mechanism 210) can be inserted into another hole on the handle 204, the handle 204 may be oriented in another direction.

Figure 3:
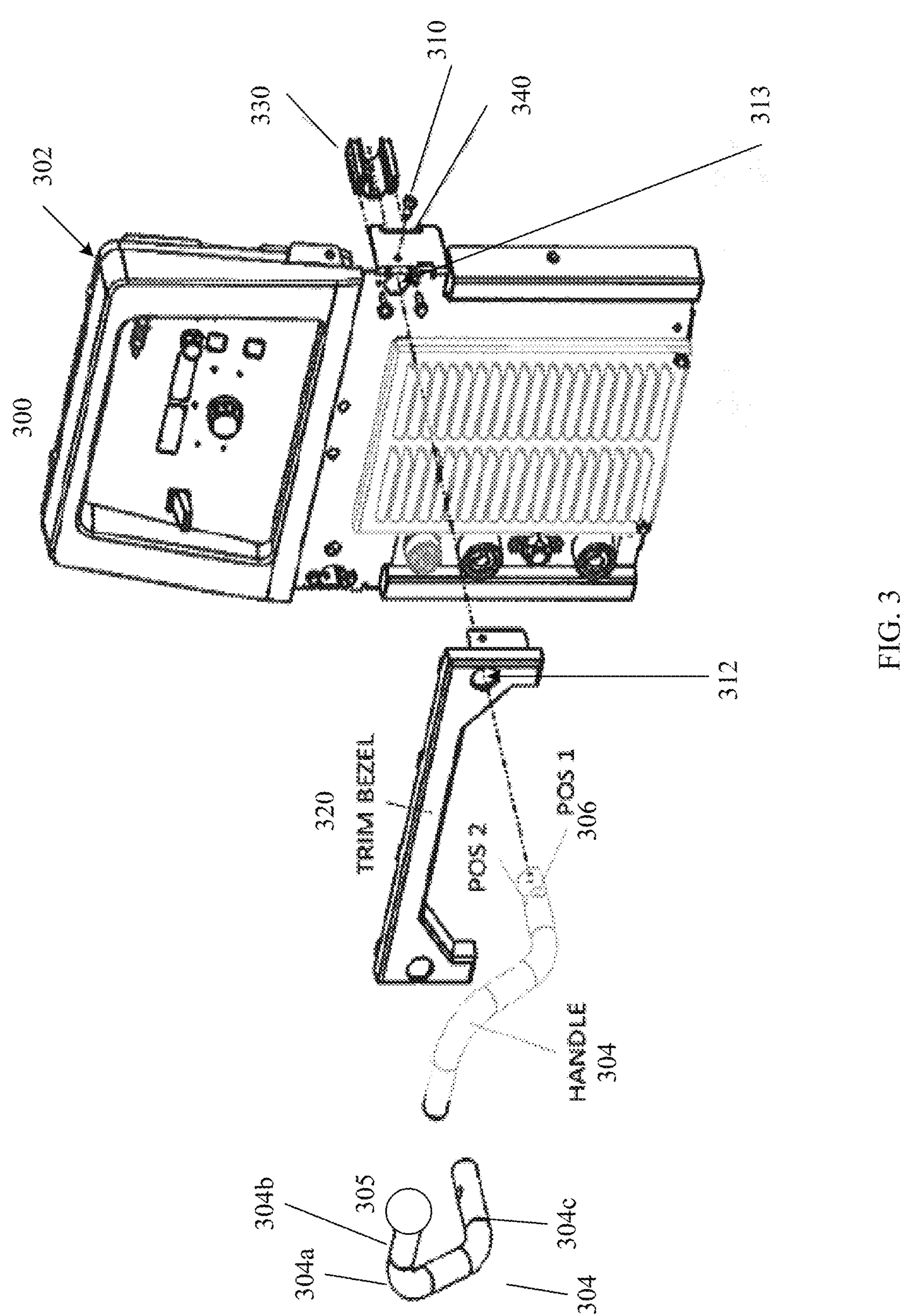
FIG. 3 is a blow-up drawing of example reconfigurable handles in accordance with an embodiment of the disclosure.

FIG. 3 is an exploded view drawing of example reconfigurable handles attaching to the example work equipment in accordance with an embodiment of the disclosure. Referring to FIG. 3, there is shown a work equipment 300 that is similar to the work equipment 100 and 200. The work equipment 300 comprises a body 302, handles 304, a securing mechanism (mounting hardware) 310, a trim bezel 320, a handle socket 330, and a stop 340. The handle 304 may be inserted into a hole 312 in the trim bezel 320 and then into a corresponding receiving hole 313 in the body 302 of the work equipment 300.

There may be, for example, a mounting socket 330 behind the receiving hole 313 that may provide support for holding the handle 304. There may also be a stop 340 to align the handle 304 such that the hole 306 can align with the securing mechanism 310.

Referring to FIG. 3, there are shown two handles 304. One of the handles 304 may have, for example, a coupling device 305 that may be used to couple the two handles 304 together to form a single handle. The coupling device 305 may be, for example, a nut on the first handle 304 that screws on to a threaded portion of the second handle 304. Accordingly, the single handle may be removed from the work equipment 300 as individual handles 304 after uncoupling the single handle to two handles, or the single handle may be removed together as a unit. This may be done, for example, by removing the securing mechanisms 310 from both sides of the work equipment 300.

In various embodiments of the disclosure, the handle 304 may comprise multiple pieces 304*a*, 304*b*, etc. The pieces 304*a* and 304*b* may be able to rotate independently of each other. Accordingly, by rotating, for example, the piece 304*a*, the handle 304 may be in a different orientation. The newly configured handle 304 may then be locked in shape by, for example, rotating the nut 305, which may tighten the multiple pieces 304*a*, 304*b*, etc. to lock the pieces in place. The nut 305 may be part of a device that comprises, for example, a flexible cable attached near an opposite end of the handle 304 as the nut 305. Accordingly, tightening the nut 305 may bring all the pieces 304*a*, 304*b*, etc. tightly together to keep them from rotating.

There may be a receiving hole in the work equipment 300 that may allow most of the handle 304 to be inserted into the body 302 of the work equipment 300. For example, this may be similar to the receiving hole 214 except there is not a handle socket 330. Accordingly, a majority of the handle 304 can be inserted freely into the body 302 when the handle 304 is not needed.

Various embodiments of the disclosure may also have one or more hinges 304*c* in the handle 304. This may allow the handle 304 to be folded down when the handle 304 is not needed. Other embodiments of the disclosure may allow the handle 304 to telescope in or out. Accordingly, the handle 304 may be telescoped in to keep it out of the way when the handle 304 is not needed, and telescoped out when the handle 304 is needed.

While it was stated for ease of description that one of the handles 304 may have a coupling device 305 that may be used to couple the two handles 304 together to form a single handle, it may be seen that an example coupling device 305 may be a nut on the first handle 304 that screws on to a threaded portion of the second handle 304. Accordingly, it can be seen that each of the two handles may provide a device that is used for coupling. Additionally, the coupling device 305 may not need a corresponding part on the other handle. For example, the coupling device 305 may clamp on to the other handle.

Accordingly, it can be seen that the disclosure provides for a work equipment, which may be a welding power source, comprises a body with a power conversion circuitry within the body, where the power conversion circuitry is configured to convert input power to welding-type power. The work equipment comprises one or more handles for physical manipulation of the work equipment, where the one or more handles are attached to the body, and at least one of the one or more handles is configured to be oriented in turn in a plurality of different positions. That is, the handle can be oriented to a second orientation different from the first orientation.

The work equipment comprises wheels and may weigh substantially 50 pounds or more. The at least one of the one or more handles are removable, and there may be a plurality of mounting positions for attaching at least one of the one or more handles.

In an embodiment, at least one of the one or more handles can be inserted into a corresponding receiving hole in the work equipment via a trim bezel. That is, a handle is inserted through a hole in the trim bezel and then into the receiving hole. The receiving hole can be, for example, a mounting socket in the body of the work equipment, and there may be a stop as a part of the mounting socket or in the body to limit insertion of the handle into the body of the work equipment and to align the handle with a securing mechanism.

A handle can be secured to the work equipment by a securing mechanism that is one or more of: a screw, a bolt, or a cotter pin. A handle can comprise a recess or a hole for a spring loaded securing mechanism to fit into to attach the handle to the work equipment or to keep the handle at a certain orientation.

In some embodiments, there may be two separate handles that can be joined together to form a single handle. The single handle may be removed intact and then re-attached intact to the work equipment.

A handle can comprise multiple pieces with a locking mechanism at one end of the handle, where the locking mechanism can be tightened to lock in place the multiple pieces so that the pieces do not move, and when the locking mechanism is loosened at least one of the multiple pieces is able to move.

A handle can be rotated to one of the plurality of orientations. A majority of the handle can also be stored in the body of work equipment to keep it out of the way when, for example, the work equipment is being stored or not used. Some embodiments may have a handle with at least one joint so that the handle can be folded out of the way. Other embodiments may allow a handle to telescope in or out. Some embodiments may allow a combination of these methods to keep a handle out of the way.

The present disclosure may also provide for two removably attached handles that can be inserted into corresponding holes in a trim piece, and then into corresponding receiving sockets that correspond to the holes in the trim piece. There may be a stop in each receiving hole to limit the insertion of the corresponding handle, and each of the handles can be attached to the work equipment using a securing mechanism. A handle can be unsecured such that the handle can be rotated to another of a plurality of orientations. When the handles are not needed, they may be removed and the holes in the trim piece can be covered with plugs.

As used herein, a welding-type power source refers to any device capable of taking input power and supplying power for welding, cladding, plasma cutting, induction heating, laser (including laser welding, laser hybrid, and laser cladding), carbon arc cutting or gouging, resistive preheating, and/or control circuitry and other ancillary circuitry associated therewith, where the device may be, but is not limited to transformer-rectifiers, inverters, converters, resonant power supplies, quasi-resonant power supplies, switch-mode power supplies, etc.

Some disclosed examples may describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy. Electric power of the kind measured in watts as the product of voltage and current (e.g., V*I power) is referred to herein as "wattage."

As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. A work equipment apparatus, comprising:

a body having a first handle socket;

power conversion circuitry positioned within the body and configured to convert input power to welding-type power; and a first handle coupled to the body at a first single end of the first handle and configured for physical manipulation of the work equipment apparatus; and a second handle configured for separately coupling to the body at a different location than the first handle, and configured for physical manipulation of the work equipment apparatus; wherein:

the first handle comprises a first proximal piece and a first distal piece, and the first proximal piece of the first handle is configured to removably couple to the first handle socket in one of a first plurality of mounting positions, and the distal piece is configured to move independently relative to the first proximal piece, to enable engaging the second handle when the first proximal piece is set in at least some of the first plurality of mounting positions.

2. The work equipment apparatus of claim 1, wherein the second handle is coupled to the body at a first single end of the second handle, and wherein:

the body further comprises a second handle socket;

the second handle comprises a second proximal piece and a second distal piece; and the second proximal piece of the second handle is configured to removably couple to the second handle socket in one of a second plurality of mounting positions.

3. The work equipment apparatus of claim 1, wherein:

the first handle socket is accessible through a hole; and the first proximal piece of the first handle is configured to removably couple to the first handle socket via the first hole.

4. The work equipment apparatus of claim 1, wherein the work equipment apparatus is a welding power source.

5. The work equipment apparatus of claim 1, comprising wheels for rolling the work equipment apparatus, wherein the work equipment apparatus weighs at least 50 pounds.

6. The work equipment apparatus of claim 1, comprising a trim bezel, wherein the trim bezel defines the first hole or the second hole through which at least one of the handles is inserted into the first handle socket or the second handle socket.

7. The work equipment apparatus of claim 1, comprising a stop to limit insertion of the first handle into the body of the work equipment apparatus.

8. The work equipment apparatus of claim 1, wherein the first handle is secured to the work equipment apparatus by one or more of: a screw, a bolt, or a cotter pin.

9. The work equipment apparatus of claim 1, wherein the first handle comprises a recess or a hole to allow a spring loaded part to fit into the recess or the hole of the handle to secure the first handle to the work equipment apparatus.

10. The work equipment apparatus of claim 1, wherein the first handle comprises multiple pieces and a locking mechanism at one end of the first handle, wherein the locking mechanism is configured such that when it is tightened the multiple pieces are locked in place so that they do not move, and when the locking mechanism is loosened at least one of the multiple pieces is able to move.

11. The work equipment apparatus of claim 1, wherein the first plurality of mounting positions comprises a first position and a second position, wherein the first handle is turned inward when in the first position and is turned outward when in the second position.

12. The work equipment apparatus of claim 1, wherein the first handle is configured to be stored in the body of the work equipment apparatus.

13. The work equipment apparatus of claim 1, wherein the first handle comprises at least one joint such that the handle is configured to fold at the at least one joint.

14. The work equipment apparatus of claim 1, wherein the first handle is configured to telescope in and out.

15. The work equipment apparatus of claim 1, wherein the first handle can be removed intact and attached intact to the work equipment apparatus.

16. A work equipment apparatus, comprising:

a body having a handle socket, wherein the body defines a top surface, a bottom surface, and a plurality of side surfaces;

a welding power source positioned within the body and configured to convert input power to welding-type power; and a handle coupled to one of the plurality of side surfaces and configured for physical manipulation of the work equipment apparatus, wherein:

the handle is configured to removably couple to the handle socket in one of a plurality of mounting positions, and the handle comprises a connection end and a distal end, the connection end is configured to enable coupling the handle to the body in a plurality of mounting positions comprising at least a first mounting position and a second mounting position, the distal end is configured to move independently relative to the connection end, such that the distal end of the handle is oriented inward when the handle is in the first mounting position and turned outward when the handle is in the second mounting position.

17. The work equipment apparatus of claim 16, wherein the work equipment apparatus weighs at least 50 pounds and comprises wheels adjacent the bottom surface that are configured to roll the work equipment apparatus.

* * * * *